No. 798,701. PATENTED SEPT. 5, 1905.
F. J. RABBETH.
FISHING REEL.
APPLICATION FILED NOV. 22, 1904.

Witnesses:
Marguerite Livermore
Jas. J. Maloney

Inventor:
Francis J. Rabbeth
by J. Ross H. Livermore
Attys.

UNITED STATES PATENT OFFICE.

FRANCIS J. RABBETH, OF REDLANDS, CALIFORNIA.

FISHING-REEL.

No. 798,701.  Specification of Letters Patent.  Patented Sept. 5, 1905.

Application filed November 22, 1904. Serial No. 233,831.

*To all whom it may concern:*

Be it known that I, FRANCIS J. RABBETH, a citizen of the United States, residing in Redlands, in the county of San Bernardino and State of California, have invented an Improvement in Fishing-Reels, of which the following description, in connection with the accompanying drawings, is a specification, like letters on the drawings representing like parts.

The present invention relates to a fishing-reel, and is embodied mainly in an automatic drag of novel construction and arrangement, the purpose of which is to prevent the reel from overrunning by momentum and tangling the line in casting. The drag is arranged to be automatically acted upon by the line, so as to be released to allow the reel-spool to run freely so long as the line is taut, but is arranged to move into position to check the reel whenever the line is slack.

In accordance with the invention the "drag" or "brake," as it may be termed, is pivoted to the reel-casing, and consists of a projection which may be adjustable endwise and which extends through an opening in said casing and is arranged to be normally in contact with the concave or outer surface of the spool-head. The said brake member may be provided with a spring to hold it thus in contact with the spool, the pivot being so positioned, however, that a slight movement of the member on its pivot will carry the brake out of contact with the spool, thus permitting the spool to run freely. The pivotally-supported brake member is provided with an arm which projects forward beyond the reel and has a lateral extension projecting across in front of the reel, the line engaging said lateral projection underneath and tending to lift the same so long as there is any tension on the line. In casting, therefore, so long as there is any pull on the line it will act against the spring and hold the brake member out of contact with the spool, and as soon as the line slackens the spring will carry the brake member into contact with the spool and check the movement thereof, thus preventing the spool from overrunning and tangling the line. The reel is further provided with a device for varying the tension of the spring and also with a lock to hold the brake out of contact with the spool if it is desired to use the reel without the automatic brake action.

Figure 1:
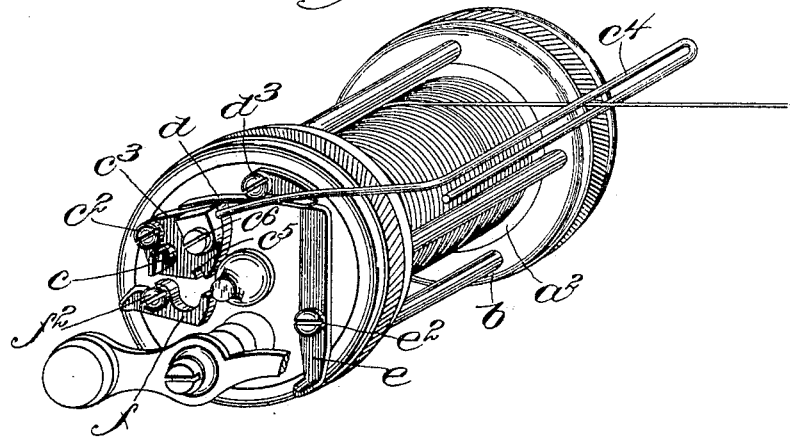
Figure 2:
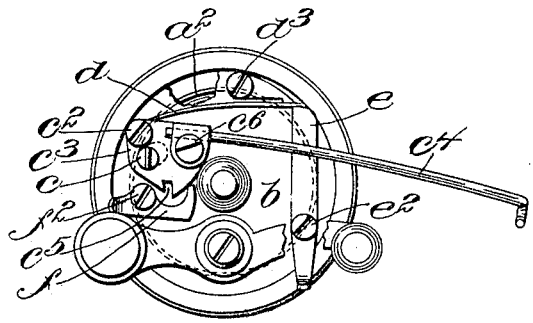

Figure 1 is a perspective view of a reel embodying the invention. Fig. 2 is an end elevation of the same, and Fig. 3 a forward horizontal section through the reel-case.

Figure 3:
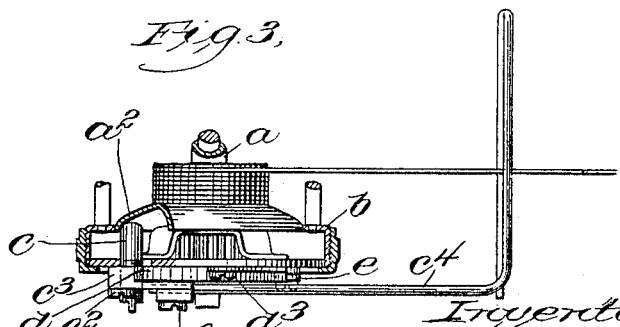

The reel-spool $a$ is rotatably mounted in the reel-frame $b$ in the usual manner, as shown in Fig. 3, the outer ends $a^2$ of the spool-head being made concave, and one of said ends is arranged to be acted upon by the drag or brake $c$, which consists of a member pivotally supported at $c^2$ upon one end of the reel-frame.

As herein shown, the brake proper, $c$, which may be of any suitable material, is adjustable endwise and may be screw-threaded in a support $c^3$, which is directly connected with the pivot $c^2$, so that the said member $c$ may be adjusted for wear from time to time, if necessary. The support $c^3$ is acted upon by a spring $d$, which tends to force the member $c$ into engagement with the concave surface of the spool end $a^2$, the said member being further provided with an arm $c^4$, which projects forward to the front of the reel and is bent so as to extend across the face of the reel, as best shown in Figs. 1 and 2, the position of said arm being such that it lies below the top of the reel, so that if the line is under the arm $c^4$ it will tend to lift the same so long as there is any tension on the line. In casting, therefore, the brake-pressure will be relieved so long as the line stays taut; but as soon as the line slackens—when, for example, the bait strikes the water—the spring will act to carry the brake into contact with the spool and check the movement thereof, so that the momentum of the spool will not cause the line to tangle.

In order to vary the tension of the spring, and thereby the drag action of the brake, the reel may be provided with a controlling member $e$, herein shown as an arm pivoted at $e^2$ on the face of the reel-frame, the said arm having a cam action upon the rear end of the pivoted spring $d$, which spring is pivoted at $d^3$. By turning the arm $e$ on its pivot, therefore, so that the upper end thereof moves toward the right, Fig. 2, the tension of the spring will be increased, while an opposite movement of the arm will cause a decrease of the tension of the spring, it being practicable, if desired, to relieve the spring tension entirely, in which case the weight of the arm $c^4$ will act to some extent to maintain the brake action.

In order that the reel may be used without the automatic drag, if desired, the device is provided with a locking member $f$, shown as a dog pivoted at $f^2$ on the face of the reel and arranged to engage with a notch $c^5$ in the member $c^3$, and the arm $c^4$ is arranged to be readily detached from the member $c^3$, being herein shown as held in position by a clamping member, which in turn is held by a screw $c^6$. The locking device is further useful to hold the member $c^3$ stationary when adjusting the brake member $c$ or operating the pivot-screw $c^2$, upon which the member $c^3$ is rocked.

What I claim is—

1. In a fishing-reel, the combination with the frame; of a reel-spool provided with a concave outer face; a drag pivotally connected with the reel-frame and normally lying in contact with said concave outer face of the spool; and means for causing said member to coöperate with the line to remove the said drag from contact with said concave outer face as said line passes from the spool, substantially as described.

2. In a fishing-reel, the combination with the spool provided with a concave outer face; of a drag for said spool; a spring to hold the said drag in frictional contact with the concave outer face of said spool; means for varying the tension of said spring; and a device operated by the line to actuate said drag, substantially as described.

3. In a fishing-reel, the combination with the reel-spool provided with a concave end; of a drag member having a pivotal support and being adjustable toward and from the reel-spool with relation to said support; means for normally holding said drag member in engagement with the reel-spool; and an arm connected with said support and projecting into the path of the line so as to hold the drag member out of contact with the spool when the line is taut, as set forth.

4. In a fishing-reel, the combination with a brake or drag to act upon the reel-spool; of means for normally holding said drag in contact with said spool; a device operated by the line to operate said drag; and a lock also coöperating with said drag, as set forth.

5. In a fishing-reel, the combination with the reel-spool; of a drag coöperating therewith, said drag being automatically controlled by the line; and means for adjusting said drag with relation to the spool, as set forth.

In testimony whereof I have signed my name to this specification in the presence of two subscribing witnesses.

FRANCIS J. RABBETH.

Witnesses:
MARGARET E. COVENEY,
HENRY J. LIVERMORE.